US005502481A

United States Patent [19]
Dentinger et al.

[11] Patent Number: 5,502,481
[45] Date of Patent: Mar. 26, 1996

[54] DESKTOP-BASED PROJECTION DISPLAY SYSTEM FOR STEREOSCOPIC VIEWING OF DISPLAYED IMAGERY OVER A WIDE FIELD OF VIEW

[75] Inventors: Aaron M. Dentinger, Briarcliff Manor; David C. Swift, Ossining; Sadeg M. Faris, Pleasantville, all of N.Y.

[73] Assignee: Reveo, Inc., Hawthorne, N.Y.

[21] Appl. No.: 339,986

[22] Filed: Nov. 14, 1994

Related U.S. Application Data

[63] Continuation-in-part of Ser. No. 126,077, Sep. 23, 1993, and a continuation-in-part of Ser. No. 269,202, Jun. 30, 1994, and a continuation-in-part of Ser. No. 976,518, Nov. 16, 1992.

[51] Int. Cl.$^6$ .................................................. H04N 13/04
[52] U.S. Cl. ........................ 348/51; 348/52; 359/458; 359/462; 353/7
[58] Field of Search .................... 348/42, 46, 47, 348/48, 51, 52, 53, 54–60, 121, 122, 123, 124; 359/462–465, 471, 472, 448, 458, 368; 353/7, 8; H04N 13/04, 13/00, 15/00

[56] References Cited

U.S. PATENT DOCUMENTS

| | | | |
|---|---|---|---|
| 3,560,644 | 2/1971 | Petrocelli et al. | 348/124 |
| 3,699,244 | 10/1972 | Cohen et al. | 348/121 |
| 3,715,154 | 2/1973 | Bestenreiner | 359/459 |
| 4,512,745 | 4/1985 | Mohon et al. | 348/123 |
| 4,526,439 | 7/1985 | Okoshi et al. | 359/458 |
| 4,623,223 | 11/1986 | Kemf | 348/51 |
| 4,634,384 | 1/1987 | Neves et al. | 348/128 |
| 4,974,073 | 11/1990 | Inova | 348/123 |
| 5,264,964 | 11/1993 | Faris | 359/464 |

*Primary Examiner*—Victor R. Kostak
*Assistant Examiner*—Michael H. Lee
*Attorney, Agent, or Firm*—Thomas J. Perkowski

[57] ABSTRACT

A desktop-based stereoscopic projection display system affording high-resolution stereoscopic and peripheral viewing of three-dimensional color imagery over a field of view of at least 180°. The projection volume required by each image projector of the display system is disposed substantially within the overall display volume of the display system, while maximizing the viewing volume within which the viewer is free to move during interactive stereoscopic viewing sessions. The display system utilizes high-resolution image projectors, keystoning correcting optics and projection-beam folding mirrors which are compactly mounted immediately above the upper volume-boundary surface of the overall display volume of the system, in order to permit the use of three-dimensional display structures having footprints and display volumes that are supportable upon desktops and in other viewing environments characterized by spatial restrictions.

18 Claims, 7 Drawing Sheets

DESKTOP-BASED PROJECTION DISPLAY SYSTEM FOR STEREOSCOPIC VIEWING OF DISPLAYED IMAGERY OVER A WIDE FIELD OF VIEW

RELATED CASES

This Patent Application is a Continuation-in-Part of co-pending patent application Ser. No. 08/126,077 entitled "A System for Producing 3-D Stereo Images" filed Sep. 23, 1993 by Sadeg M. Faris; co-pending patent application Ser. No. 08/269,202 entitled "Methods for Manufacturing Micro-Polarizers" filed on Jun. 30, 1994 by Sadeg M. Faris; and co-pending patent application Ser. No. 07/976,518 entitled "Method and Apparatus for Producing and Recording Spatially-Multiplexed Images for Use in 3-D Stereoscopic Viewing Thereof" filed Nov. 16, 1992 by Sadeg M. Faris. Each of these co-pending Patent Applications is incorporated herein by reference in its entirety.

BACKGROUND OF THE INVENTION

1. Field of Invention

The present invention relates generally to an improved method and system for simultaneously projecting a plurality of optical images onto a three-dimensional display surface, and more particularly to a desktop-based stereoscopic display system of compact construction allowing viewers to use their peripheral and stereoscopic vision and thus perceive displayed imagery with a sense of realism commensurate with natural viewing of physical reality.

2. Brief Description of State of the Art

In the contemporary period, stereoscopic display systems are widely used in diverse image display environments. The value of such image display systems resides in the fact that viewers can view objects with depth perception in three-dimensional space.

Most stereoscopic image display systems employ either planar or substantially planar display surfaces (i.e. screens) having an inherently limited field of view. While it is possible to extend the viewer's field of view by simply increasing the horizontal and vertical dimensions of the display screen, a number of tradeoffs naturally arise, such as excessively large display screens and image distortion which are unacceptable in typical viewing environments.

While prior art flat-screen stereoscopic display systems permit stereoscopic viewing of 3-D objects, such display systems generally do not permit scotopic viewing of 3-D objects. Consequently, whenever displayed imagery of three-dimensional objects is viewed stereoscopically using a flat-panel stereoscopic display system, such objects always appear to lack the sense of realism experienced during natural viewing of three-dimensional objects in physical reality.

In order to permit viewers to view objects peripheral as well as stereoscopically, some prior art projection-based display systems simultaneously display plural sets of images onto three-dimensional display surfaces which partially or entirely surround the viewer. Examples of such prior art stereoscopic projection display systems are described in greater detail in the 1993 technical paper "Surround-Screen Projection-Based Virtual Reality: The Design and Implementation of the CAVE" by Carolina Cruz-Neira, et al., (published at pages 135–142 in Volume 8 of the Journal of American Computing Machinery Association), as well as the references cited therein. While providing viewers with a greater sense of realism than otherwise attainable using planar or substantially planar display surfaces, such prior art stereoscopic projection display systems suffer from a number of shortcomings and drawbacks.

For example, prior art stereoscopic projection display systems have large footprints, requiring large amounts of floor space for normal set-up and operation. Also, in prior art projection display systems, the projection volume required by each image projector generally extends outside the overall display volume of the system, and thus large light-tight enclosures are required in normal light environments.

Consequently, using prior art image projection arrangements and display structures, it has been virtually impossible to construct a physically compact projection display system for high-resolution stereoscopic and peripheral viewing of displayed imagery of colored three-dimensional objects, in desktop-viewing environments.

Thus there is a great need in the art for a stereoscopic projection display system having such functionalities, while avoiding the shortcomings and drawbacks associated with prior art display systems and methodologies.

OBJECTS AND SUMMARY OF THE INVENTION

Accordingly, it is a primary object of the present invention to provide an improved projection display system capable of simultaneously displaying plural images of 3-D objects from different viewing directions in a manner which permits viewers to use both their stereoscopic and peripheral (i.e. peripheral) vision, while avoiding the shortcomings and drawbacks of prior art projection-based stereoscopic display systems.

Another object of the present invention is to provide a stereoscopic projection display system affording high-resolution stereoscopic and peripheral viewing of three-dimensional color imagery over a field of view (FOV) of at least 180°, while utilizing a three-dimensional display structure having a compact construction particularly adapted for use in interactive desktop-viewing environments.

Another object of the present invention is to provide a desktop stereoscopic projection display system of compact construction which can be mounted on a support base, or directly on a floor surface, permitting viewers to use their peripheral vision during interactive stereoscopic viewing, while avoiding the use of obtrusive head-mounted display equipment and claustrophobic display structures.

Another object of the present invention is to provide a desktop stereoscopic projection display system, in which the projection volume required by each image projector thereof is disposed substantially within the overall display volume of the system, while maximizing the viewing volume within which the viewer is free to move during interactive stereoscopic viewing sessions.

Another object of the present invention is to provide a desktop stereoscopic projection display system, which utilizes high-resolution image projectors, keystoning correcting optics and projection-beam folding mirrors which are compactly mounted immediately above the upper volume-boundary surface of the overall display volume of the system, in order to permit the use of three-dimensional display structures having footprints and display volumes that are supportable in space-limited viewing environments, such as desktop surfaces.

Another object of the present invention is to provide a novel method of simultaneously projecting a plurality of spatially-multiplexed images onto the three-dimensional display surface of a stereoscopic projection display system having a predetermined display volume, so that the ratio of (i) the viewing volume of the display system to (ii) the total image projection volume of the display system is maximized, thereby providing the viewer with the greatest degree of movement with respect to the three-dimensional display surface, without compromising his or her use of peripheral vision during stereoscopic viewing of displayed imagery of three-dimensional objects.

Another object of the present invention is to provide a desktop stereoscopic projection display system, in which the light rays associated with each projected image are well confined within its respective projection volume so that the viewing volume occupied by the viewer during viewing sessions is substantially free of such projected light rays.

Another object of the present invention is to provide a desktop stereoscopic projection display system, in which polarized spatially multiplexed images (SMI) are projected onto the three-dimensional display surface of the system of the present invention and viewed through a pair of electrically-passive polarizing eye-glasses, in order to view the display imagery stereoscopically without the fatiguing effects of flicker associated with field sequential display techniques.

Another object of the present invention is to provide a stereoscopic projection display system, which can be easily mounted onto a moveable support platform and thus be utilizable is flight-simulators, virtual-reality games and the like.

A further object of the present invention is to provide a stereoscopic projection display system which is particularly adapted for use in scientific visualization of diverse data sets, involving the interactive exploration of the visual nature and character thereof.

These and other objects of the present invention will become apparent hereinafter and in the claims.

BRIEF DESCRIPTION OF THE DRAWINGS

For a more complete understanding of the Objects of the Present Invention, the Detailed Description of the Illustrated Embodiments should be read in conjunction with the accompanying Drawings, in which.

DETAILED DESCRIPTION OF THE ILLUSTRATED EMBODIMENTS

Referring to FIGS. 1 through 4B, the projection display system of the present invention will be described in great detail hereinbelow.

In general, the projection display system of the present display system can be used to view monoscopic as well as stereoscopic color imagery of three-dimensional objects, whether of real, synthetic or hybrid (i.e. part-real/part-synthetic) character. However, for purposes of illustration, the illustrative embodiments of the projection display system are particularly adapted for simultaneously displaying plural polarized spatially-multiplexed images (SMIs) so that a viewer, wearing electrically-passive polarizing eye-glasses, is capable of stereoscopically and peripherally viewing displayed imagery of three-dimensional objects and scenery. Suitable techniques for generating spatially-multiplexed images using computational techniques are disclosed in co-pending Application of Sadeg M. Faris, Ser. No. 07/976,518 filed Nov. 16, 1992, and incorporated herein by reference. Suitable techniques for generating spatially-multiplexed images using optical techniques are disclosed in co-pending Application of Sadeg M. Faris, Ser. No. 08/126,077 filed Sep. 23, 1993, also incorporated herein by reference.

It is understood, however, that there are other stereoscopic display techniques, such as field (or frame) sequential displaying or spectral-multiplexing displaying, which may be utilized with the projection display system of the present invention. When using other stereoscopic display techniques to practice the image projection system and method of the present invention, various modifications to the projection display system hereof will need to be made. However, after having read the teachings of the present disclosure, such modifications will be within the knowledge of one of ordinary skill in the art.

Figure 1:
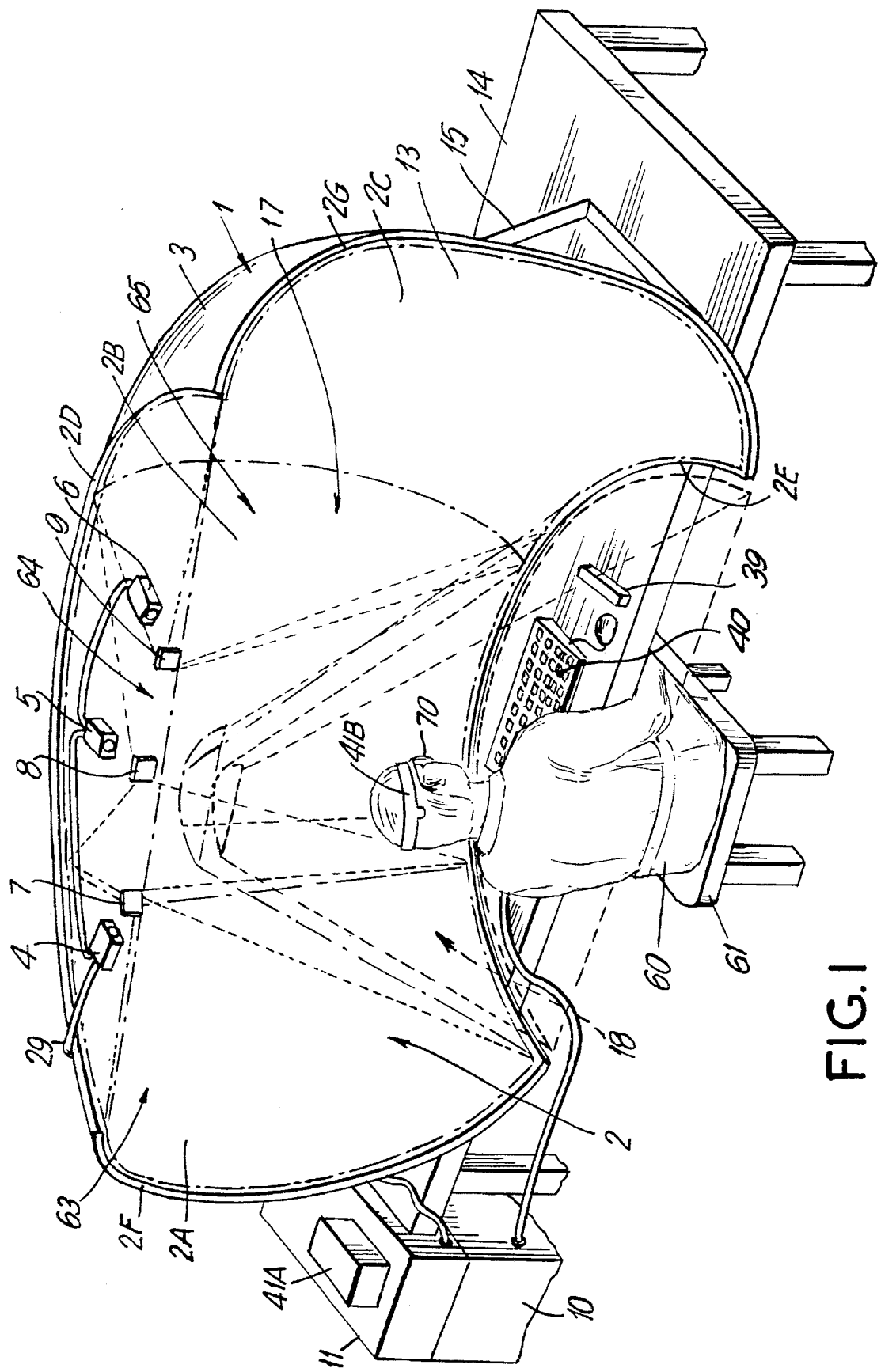
FIG. 1 is a perspective view of a first illustrative embodiment of the stereoscopic projection display system of the present invention, showing a viewer sitting before the plural display surface regions of the three-dimensional display surface of the system, as well as the image projectors and folded optics installed immediately above the display volume of the system, while schematically illustrating the overall display volume of the system, the plural projection volumes within which projected light rays are confined to propagate during the light ray projection process, and the projection-ray free viewing volume within which the viewer is free to move and stereoscopically view images of 3-D objects, using his or her peripheral vision.
Figure 4A:
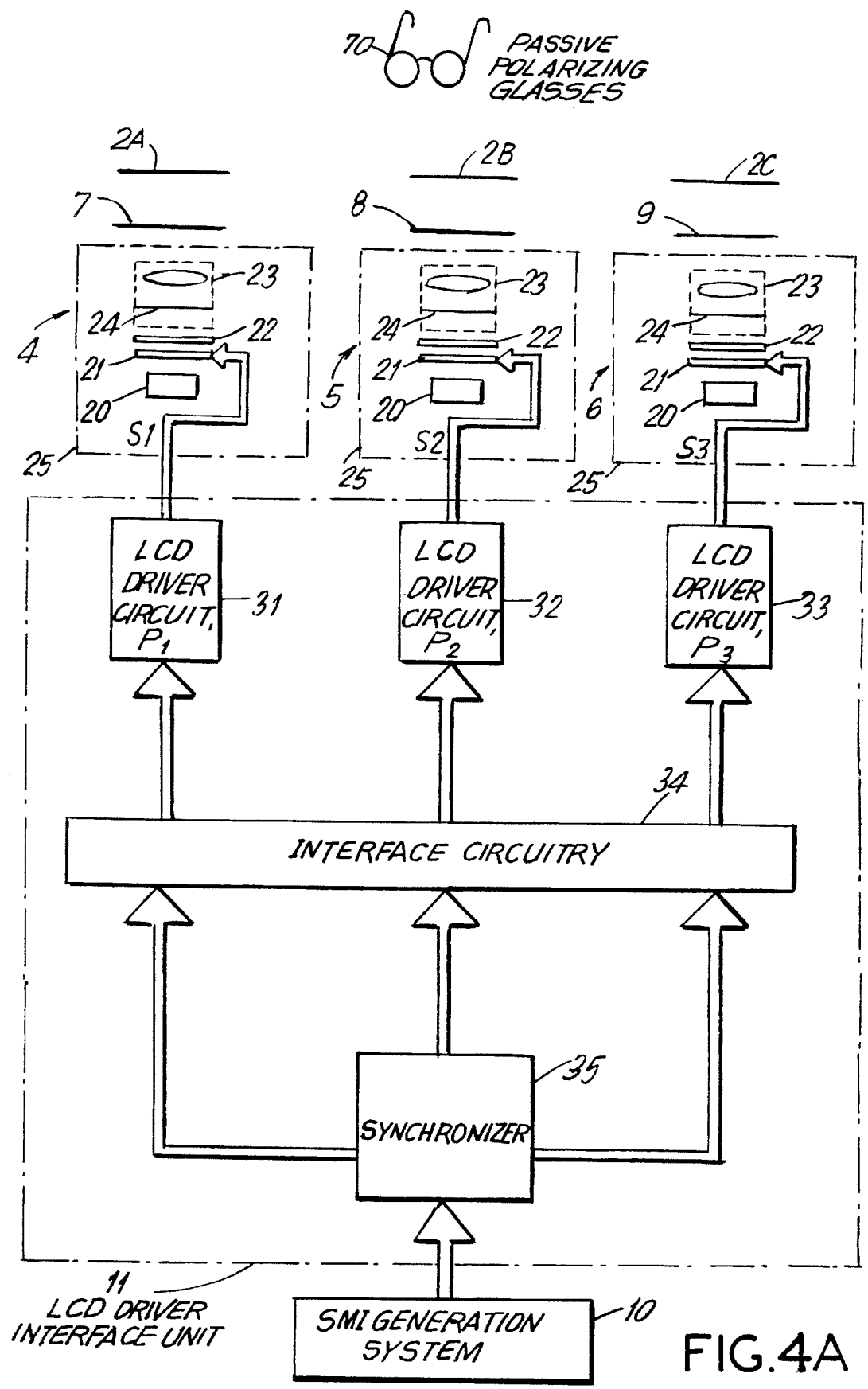
FIG. 4A is a block system diagram of the stereoscopic projection display system of the present invention, showing the computer-based SMI generation subsystem, the LCD driver/interface unit, and the optical and electro-optical subcomponents of image projection subsystem.

As shown in FIGS. 1 and 4A, the projection display system of the first illustrative embodiment comprises several major components, namely: a three-dimensional display structure 1 of compact construction having an electrically-passive display surface 2 with left, central and right display surface regions 2A, 2B and 2C as shown, supported by a structural means 3, such as molded plastic substrate, foam support sections connectable together, or an inflatable shell; an image projection subsystem including miniature first, second and third electrically-addressable, high-resolution LCD-panel based image projectors 4, 5 and 6, respectively, and first, second and third projection-beam folding optical elements (e.g. planar mirrors) 7, 8 and 9, respectively, each being supported immediately above the upper boundary surface of the display volume assumed by the three-dimensional display surface, using suitable lightweight support members; a SMI generation subsystem 10 for simultaneously generating in real-time, for each i-th display period, the first, second and third SMI data sets {Ia,i, Ib,i and Ic,i} for conversion into first, second and third digital signals S1, S2, and S3; and an LCD driver/interface unit 11 for converting a first, second and third SMI data sets (i.e. Ia,i, Ib,i and Ic,i) into first, second and third electrical digital signals S1, S2, and S3, respectively, for use in electrically-addressing and driving LCD-based image projectors 4, 5 and 6 in an manner which produces first, second and third SMI images.

As illustrated in FIG. 1, three-dimensional display surface 2 has a generally concave geometry and comprises a number of topologically describable surface structures, namely: an upper edge surface 2D bordering the left, central and right display surface regions 2A, 2B and 2C; a lower edge surface 2E also bordering the left, central and right display surface regions; a first side edge surface 2F bordering the left display surface region 2A; and a second side edge display surface 2G bordering the right display surface region 2C. As shown, left, central and right display surface regions 2A, 2B and 2C of the three-dimensional display surface are spatially contiguous with each other, as shown, and form a seamless light reflective surface bearing a thin polarization-preserving coating 13 made from materials well known in the art. As shown, the display structure is supported upon a desktop surface 14 by way of lower edge surface 2E and a pair of support legs 15.

As shown in FIG. 1, a number of volume-boundary surfaces are defined in order to specify the geometrical characteristics (e.g. boundaries) of the three-dimensional display surface of the display system. In particular, upper edge surface 2D defines an upper volume-boundary surface; lower edge surface 2E defines a lower volume-boundary surface; and first and second edge surfaces 2F and 2G collectively define a front volume-boundary surface, as shown. In turn, upper and lower volume-boundary surfaces 2A and 2B, the front volume-boundary surface and the three-dimensional display surface itself collectively circumscribe a three-dimensional display volume 17 disposed in the direction of the concavity of the three-dimensional display surface. In the first illustrative embodiment, the footprint size of the three-dimensional display structure is 2.5 feet deep, 4.75 feet wide and 3 feet high; the field of view of the display structure is 180° at the front volume-boundary surface; and volumetric capacity of three-dimensional display volume of the system is less than about 35 cubic feet.

Figure 3:
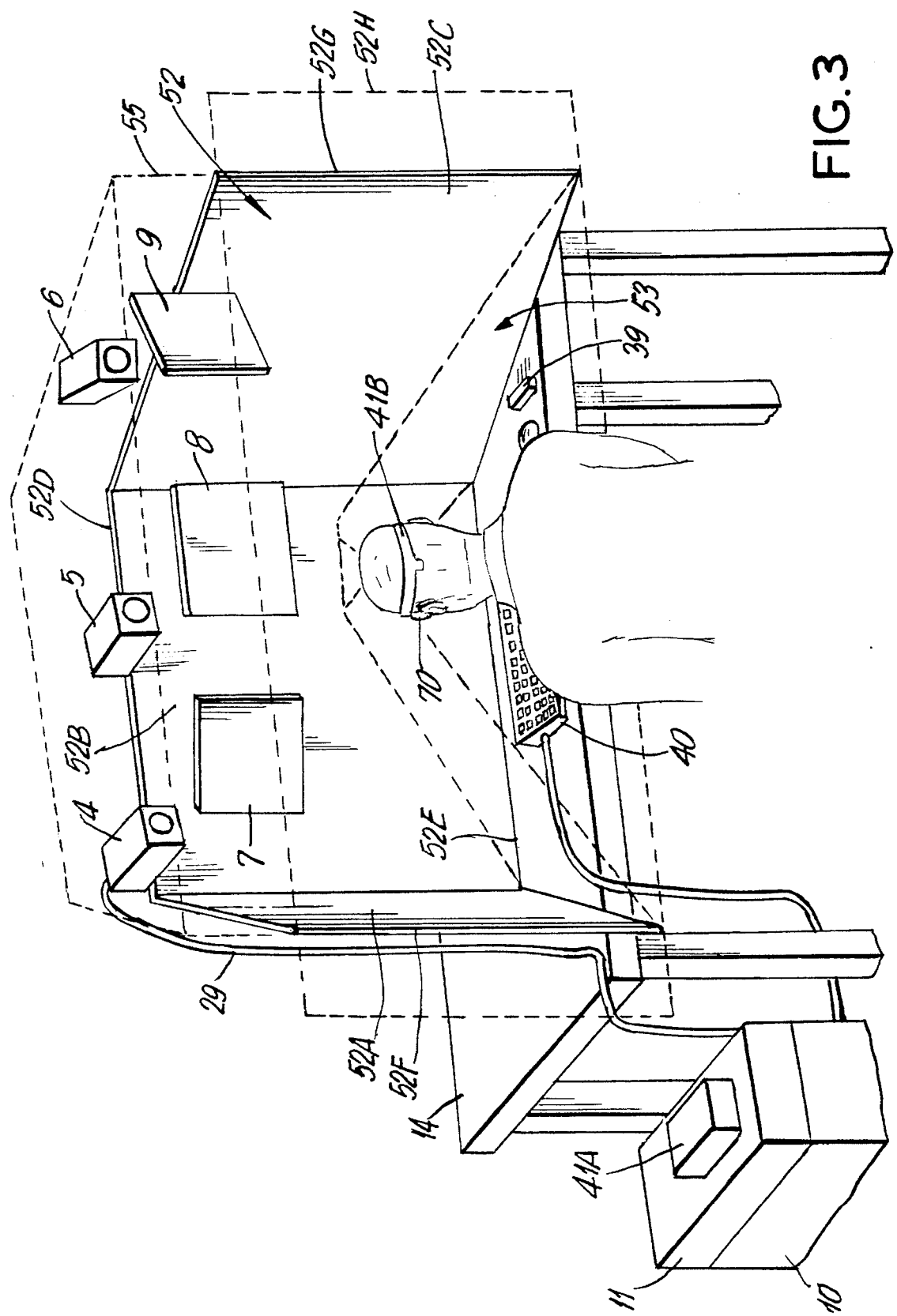
FIG. 3 is a perspective view of a second illustrative embodiment of the stereoscopic projection display system of the present invention, showing a viewer sitting before the plural display surface regions of the three-dimensional display surface of the system, as well as the image projectors and folded optics installed immediately above the display volume of the system, while schematically illustrating the overall display volume of the system, the plural projection volumes within which projected light rays are confined to propagate during the light ray projection process, and the projection-ray free viewing volume within which the viewer is free to move and stereoscopically view displayed images of three-dimensional objects, using his or her peripheral vision.
Figure 3A:
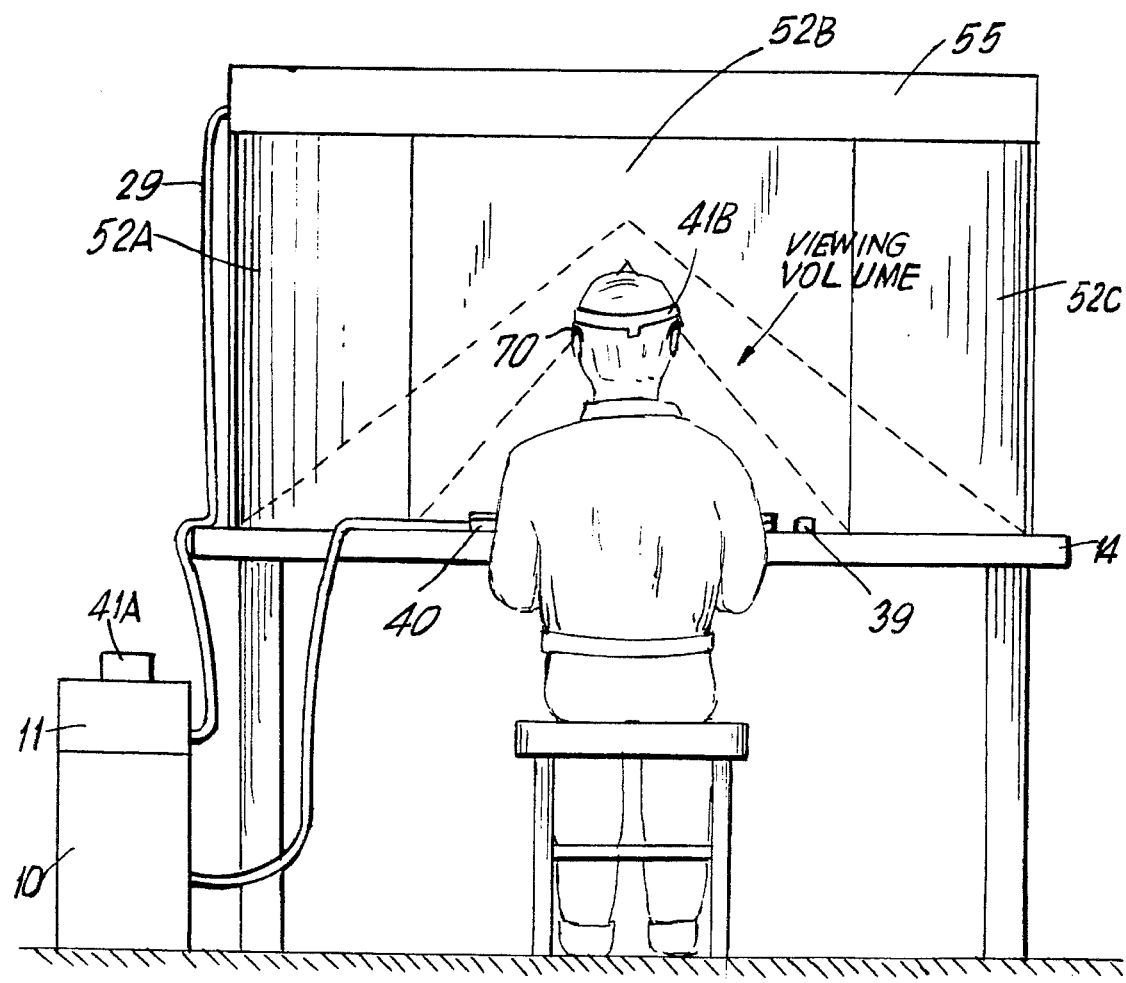
FIG. 3A is an elevated front view of the stereoscopic display system of FIG. 3, taken along an axis normal to the plane of the central display surface region of the three-dimensional display surface of the system.

In accordance with the principles of the present invention, the viewing volume is a function of the field of view of the viewer with respect to the three-dimensional display surface of the system. As shown in FIG. 1 and FIGS. 3, the viewer's eyes are situated with respect to the three-dimensional display surface such that a 180° field of view is provided. If the viewer moves within the viewing volume, closer towards the central display surface region, then a field of view greater than 180° will be afforded to the viewer. Thus, by definition, the viewing volume shall be said to include at least the overall display volume which is not occupied (i.e. spatially overlapped) by the projection volume of each of the image projectors employed in the projection display system. Accordingly, the minimal viewing volume 18 of the projection display system is schematically illustrated in FIGS. 1 and 3 by way of dotted lines.

In the illustrative embodiment, each LCD image projector 4, 5 and 6 comprises an intense source of white light 20, and an electrically-addressable color LCD-panel 21 (i.e. programmable spatial light intensity mask), upon which an ultra-thin micropolarization panel 22 is directly mounting using lamination techniques. Preferably, each miniature color LCD-panel has a diagonal dimension of 1.5 inches, with 480 rows of RGB pixel sets extending along its vertical dimension, and 380 RGB pixel sets extending along each of the 480 rows, thereby providing a 480×380 matrix of RGB pixel sets within the LCD-panel. Such miniature LCD-panels can be obtained from the Sony Corporation or Hitachi Corporation.

The structure and function of micropolarization panel 22 is disclosed in co-pending application Ser. No. 08/126,077, supra, and may be made using manufacturing techniques disclosed in U.S. Pat. No. 5,327,285 granted to Sadeg M. Faris, and incorporated herein by reference in its entirety. Micropolarization panels of various sizes and spatial resolutions are commercially available from Reveo, Inc. of Hawthorne, N.Y., under the trademark μPol™.

As shown in FIG. 4A, an image projecting optics assembly 23 preferably of compact construction is fixedly mounted along the optical axis of each LCD-panel 21, immediately in front of micropolarization panel 22. Preferably, a Fresnel or holographic type lens panel 24 is mounted among the optical elements of this optics assembly. The function of lens panel 24 is to optically correct for the image-distorting phenomena known as "keystoning", which occurs during each display period when the polarized SMI produced by the image projector is projected onto its respective display surface region by way of its operably associated projection-beam folding mirror. In the illustrative embodiment, all of the optical and electro-optical components of each image projector are mounted within miniature housing 25 of rugged construction.

Figure 2:
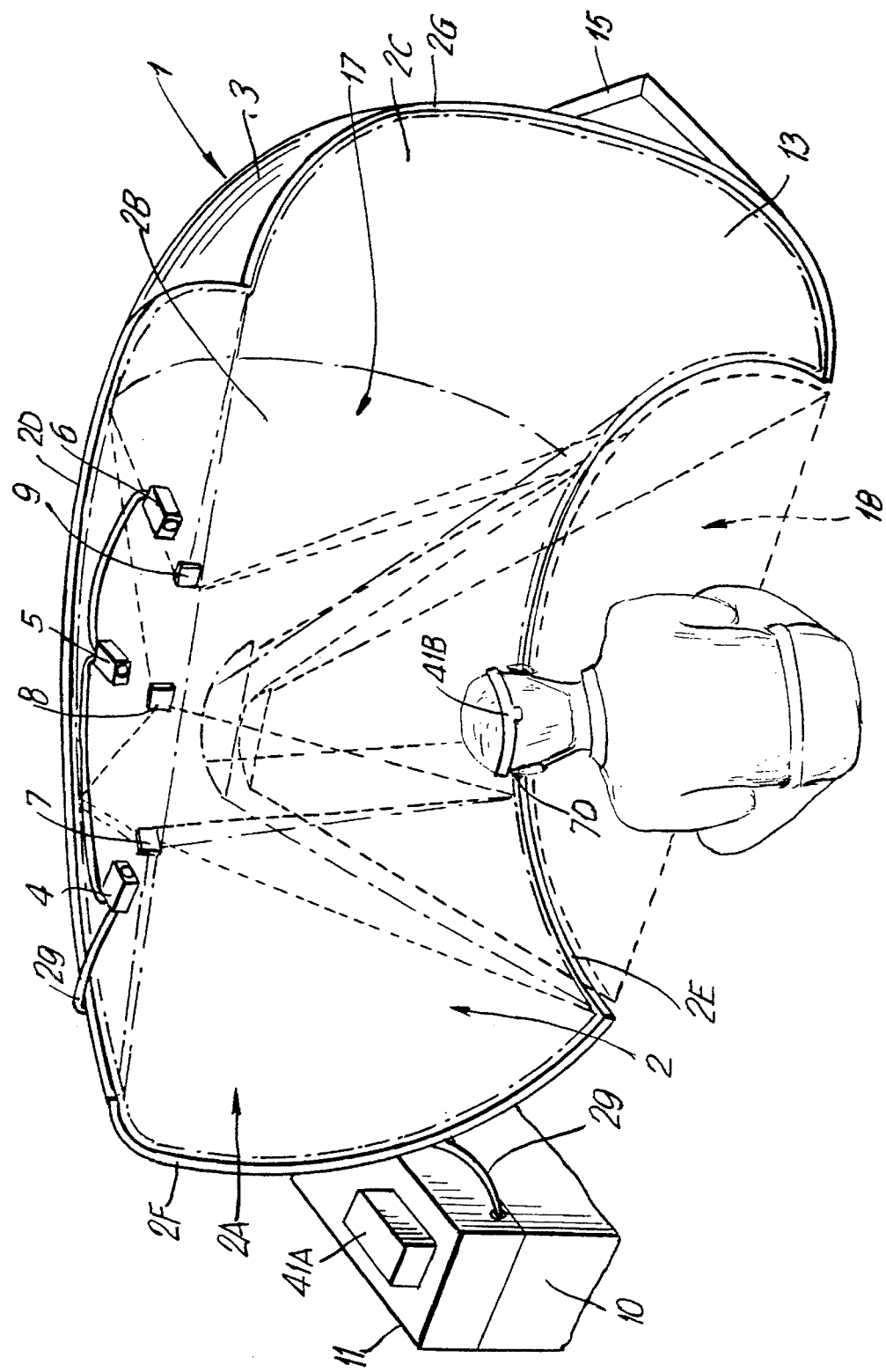
FIG. 2 is a perspective view of the stereoscopic projection display system of FIG. 1 shown supported on a floor surface, permitting the viewer to freely move within the predetermined viewing volume, and stereoscopically and peripherally view displayed images of three-dimensional objects.

The manner in which the LCD image projectors are mounted relative to the three-dimensional display surface of the system, will vary from embodiment to embodiment of the present invention. Preferably, each of the image projectors is mounted with respect to each other by way of a lightweight optical bench made of molded plastic (not shown for purposes of clarity of illustration). The optical bench is supported immediately above the upper volume-boundary surface of the system using a telescopic support rod that can be adjusted to supportably extend from the upper edge of opposing side surfaces of the three-dimensional display structure, as shown. A flexible cable 29, carrying electrical signals S1, S2, and S3, extends from the housing of LCD driver/interface unit 11 to each of the image projectors 4, 5 and 6, as shown in FIGS. 1, 2 and 3.

As best shown in FIG. 1, each image projector aboard the optical bench is fixedly mounted immediately above the upper volume-boundary surface 2D of the projection display system, while the optical projection axis thereof is oriented in the direction of the concavity of the three-dimensional display surface (i.e. the viewer). In addition, each projection-beam folding mirror is also fixedly mounted immediately above the upper volume-boundary surface of the system, but unlike the image projectors, its projection axis (i.e. measured normal to the plane of the mirror) is oriented in the direction of the display surface region towards which, incident light rays from its associated image projector are directed while remaining confined to its projection volume (i.e. cone). In the illustrative embodiments, the precise position and orientation of each image projector and projection-beam folding mirror, relative to its respective display surface region, is computed using computer modeling techniques, including ray tracing and homogeneous transformations, well known in the art.

Notably, during each display period of the display system, the function of left image projector 4 and its projection-beam folding mirror 7 is to produce a first polarized SMI image of a three-dimensional object viewed along a left viewing direction; the function of central image projector 5 and its projection-beam folding mirror 8 is to produce a central polarized SMI image of the three-dimensional object viewed along a central viewing direction; and the function of right image projector 6 and its projection-beam folding mirror 9 is to produce a right polarized SMI image of the three-dimensional object viewed along a right viewing direction. The process by which each SMI triplet {Ii,a, Ii,b, Ii,c} is produced by SMI generation subsystem 10 during an interactive viewing session, will be described in greater detail hereinafter.

As shown in FIG. 4A, LCD driver/interface unit 11 of the illustrative embodiment comprises first, second and third LCD-panel driver circuits 31, 32 and 33, for producing first, second and third digital electrical signals S1, S2 and S3, respectively. These digital driver signals are representative of the polarized left, central and right SMI images to be produced by LCD image projectors 4, 5 and 6 during the i-th display period. More specifically, these digital driver signals are used to electrically address and drive particular RGB pixels in the high-resolution LCD-panel of each image projector, to a particular light-modulating/color value in order to achieve the desired spatial-light intensity and spectral filtering required by the optically-based SMI image being produced. These driver signals are produced by interface circuitry 34 within LCD driver/interface unit 11 in response to SMI data sets being provided to the interface circuitry 11 in a time-synchronized manner by way of synchronizing circuitry 35. Preferably, the circuitry associated with LCD driver/interface unit 11 is realized on printed circuit(PC) boards using conventional manufacturing techniques. In the illustrated embodiment, such PC boards and a power supply are mounted within a compact housing having input and output ports which permit the unit to be interfaced with the LCD image and the SMI generation subsystem using conventional cable connectors (not shown).

Figure 4B:
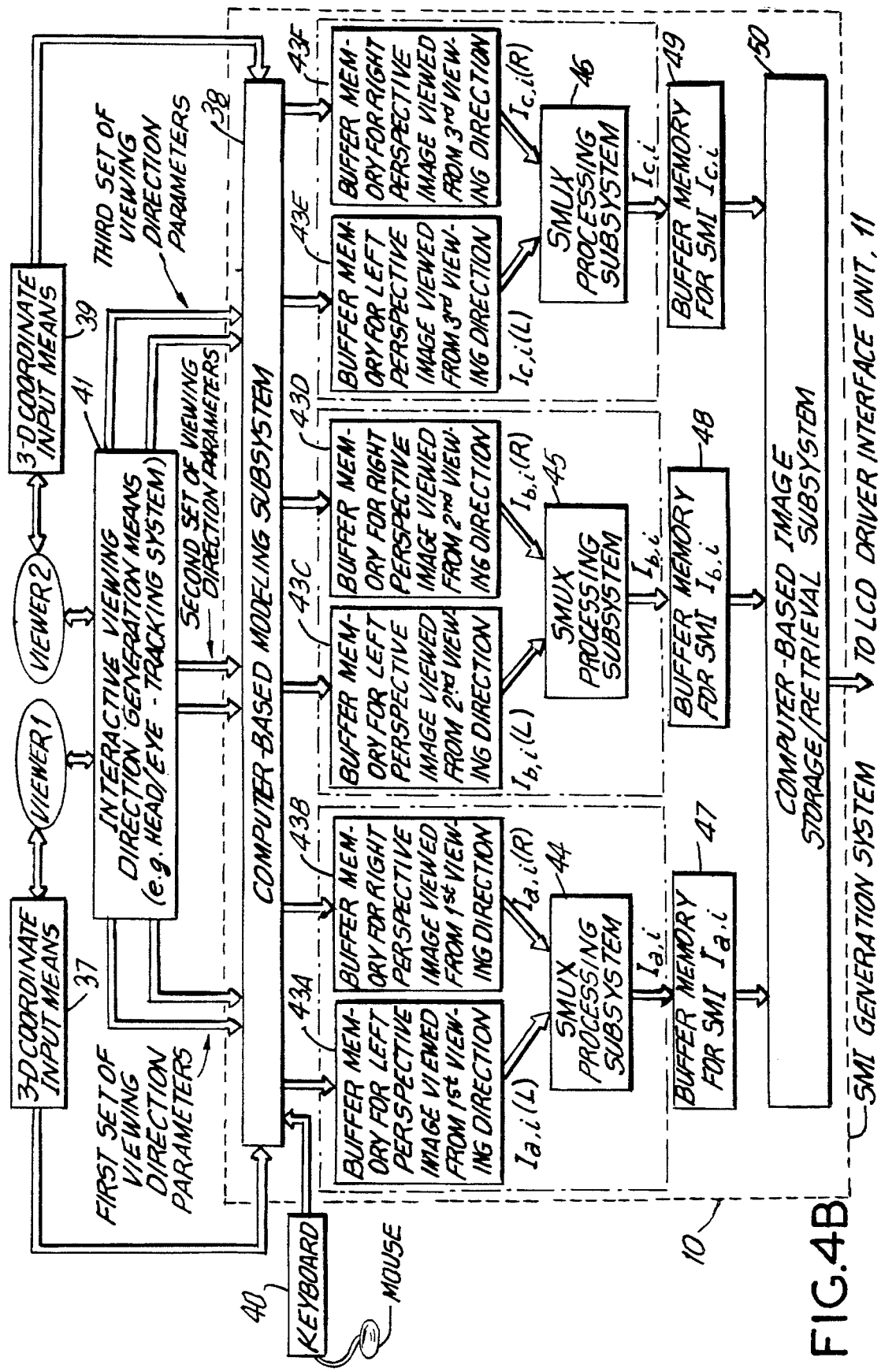
FIG. 4B is a block functional diagram of the SMI generation subsystem of the stereoscopic projection display system of FIG. 4A.

Referring to FIG. 4B, the subsystem and process by which SMI triplets are produced during each (i-1)th display period, will now be described.

In the illustrative embodiment, the viewer at each instant of time $\Delta T$ automatically selects a plurality of different viewing direction parameters {VD1, VD2, VD3} by simply moving his or her head within the predefined viewing volume of the system. Each set of viewing direction parameters determines the field of view (FOV) through which the viewer will be allowed to selectively view real or synthetic 3-D imagery represented within a computer-based modeling subsystem 38 of the display system. Within each field of view selected by the viewer by virtue of his or her head and/or eye position, the viewer may observe (through eye movement) three-dimensional imagery on the display at any one of an infinitely set of viewing directions. Such three-dimensional imagery may be represented using conventional display-list graphics techniques (i.e. using lists of 3-D geometric equations and parameters) or voxel-based techniques. In one illustrative embodiment, computer-based modeling subsystem 10 may be realized using a parallel computing system of the type disclosed in U.S. Pat. No. 5,361,385 to Bakalash entitled "Parallel Computing System For Volumetric Modeling, Data Processing and Visualization" incorporated herein by reference in its entirety. 3-D coordinate type input data can be provided to subsystem 10 by way of a conventional 3-D coordinate input device 39 (such as Polhemus or Ascension tethered electromagnetic sensors), while alphanumeric-type input data can be provided to subsystem 10 by way of a conventional keyboard 40.

The set of viewing direction parameters are generated using a head/eye-tracking system 41. In the illustrative embodiments, head/eye tracking system 41 comprises a base or reference unit 41A situated for example, atop LCD driver/interface unit 11, and a head-mounted sensor 41B worn on the head of the viewer. In response to viewer head movement and eye orientation, the head-mounted sensor 41B produces electro-magnetic position/orientation signals indicative of the position and orientation of the viewer's viewing (gazing) direction during time interval $\Delta T$. These electromagnetic signals are received by base unit 41A and are used to determine (i.e. compute) a set of viewing direction parameters {VD1, VD2, VD3} characteristic of the viewer's field of view at each time instant $\Delta T$.

It should be noted that in alternative embodiments, head/eye tracking system 41 may be realized using a pair of infra-red cameras mounted at the lower edge surface 2E of the three-dimensional display structure, in order to capture images of the viewer's eyes on a real-time basis. Using such captured images and various techniques (e.g. image processing, computational geometry and homogeneous transformations), the position and orientation of each of the viewer's eyes can be computed for time interval $\Delta T$, and thereafter provided to the base unit for use in computing a set of viewing direction parameters. Preferably time interval $\Delta T$ is selected to be very small so that the field of view of the displayed imagery will track the viewer's field of view into the three-dimensional display surface of the system, with minimal error.

The computed set of viewing direction parameters are provided to computer-based modeling subsystem 38 within the SMI generation system 10. Preferably, SMI generation system 10 is realized by a parallel computing system. The computer-based modeling subsystem 38 uses the set of computed viewing direction parameters to generate left and right perspective image projections for the left, central and right viewing directions. In the illustrative embodiments, the projection plane for each viewing direction is taken to be the corresponding display surface region (e.g. 2A, 2B, 2C) on the three-dimensional display surface. These generated perspective images are buffered in buffer memory devices (e.g. VRAM) 43A through 43F operably associated with the SMI generation subsystem. Then using computer-implemented SMUX processing subsystems 44, 45 and 46, the left and right perspective images for the left, central and right viewing directions are processed by its respective SMUX processing subsystem in order to produce a SMI for each of the three viewing directions specified by the viewer's head position. These SMIs are buffered in buffer memory devices 47, 48 and 49 associated with the SMI generation subsystem. As shown in FIG. 4B, a computer-based image storage/retrieval system 50 is provided for storing the SMI triplets, accessing them, and providing such images to the LCD driver/interface unit during each i-th display period.

In FIG. 3, the desktop-based projection display system of FIG. 1 is shown supported on a substantially planar floor surface so that a viewer, sitting within the predetermined viewing volume thereof, can freely move therewithin and stereoscopically and peripherally view three-dimensional. imagery displayed on the three-dimensional display surface of the system. In an alternative embodiment, the three-dimensional display structure can be supported off the surface by way of a pedestal-like support base (not shown). The support base would have base portion which rests on the floor surface, a support platform which is coextensive with the lower edge surface of the display structure, and a pedestal portion extending between the support base and the support platform. The support platform would be adapted to receive and support the lower edge surface of the three-dimensional display structure at predetermined distance off the floor surface below. The viewer could side within a chair or stand on the floor surface, within the predetermined viewing volume of the system during a viewing session.

Figure 3B:
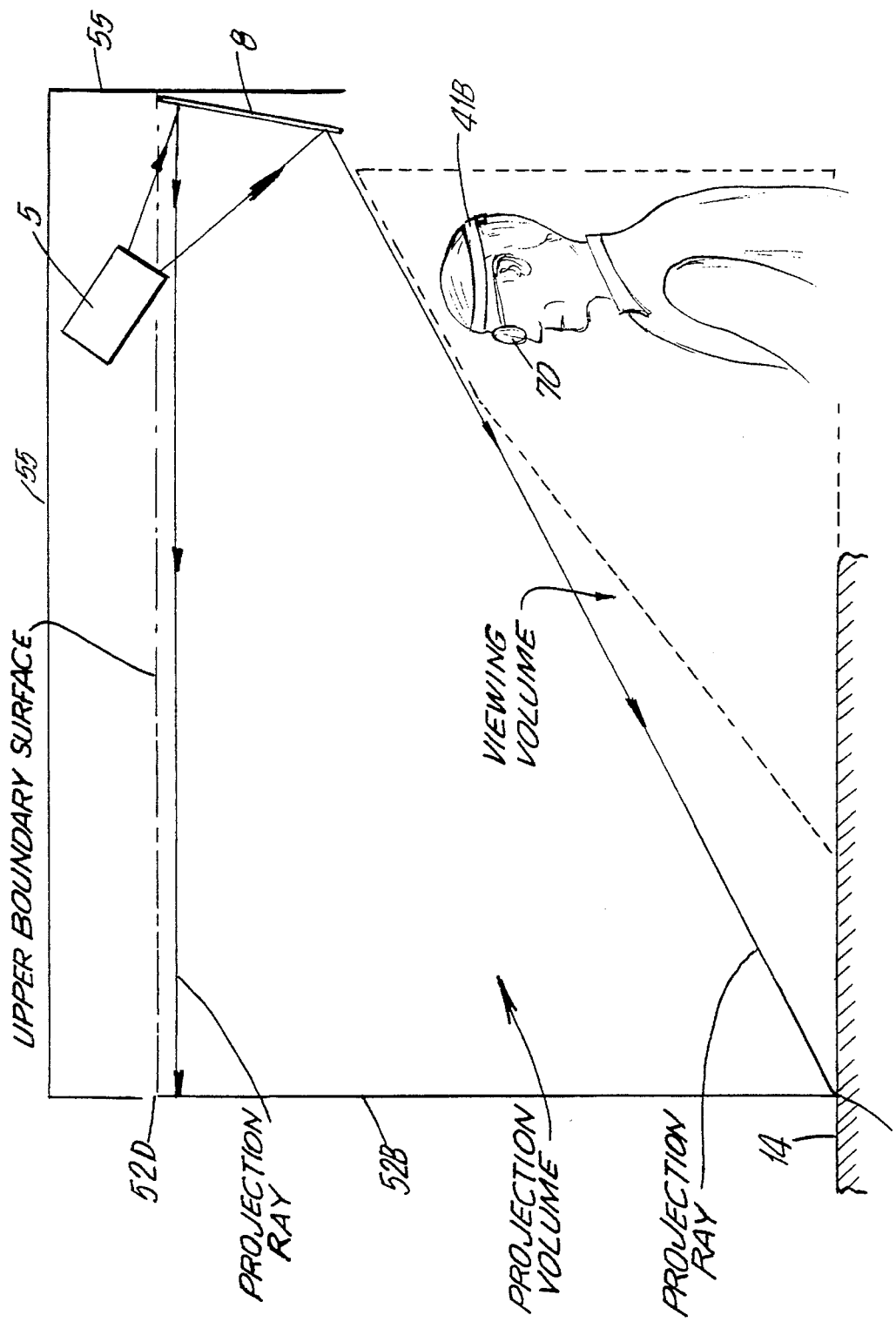
FIG. 3B is an elevated side view of the stereoscopic projection display system of FIG. 3, showing the projection-ray free viewing volume of the system in spatial relation to the central projection volume of the central image projector of the system.

In FIGS. 3 to 3B, a second illustrative embodiment of the stereoscopic display system hereof is illustrated. The only major difference between the system of FIG. 3 and the system of FIG. 1 is that the system of FIG. 3 has a three-dimensional display surface 52 which is constructed from three separate rectangular display panels 52A, 52B and 52C, each of which is hingedly connected to an adjacent panel in a seamless manner, as shown in FIG. 3.

As shown in FIG. 3, upper edge surface 52D of three-dimensional display surface comprises first, second and third rectilinear edge surfaces; lower edge surface 52E thereof also comprises first, second and third rectilinear edge surfaces; and first and second rectilinear edge surfaces 52 F and 52G thereof collectively define a front volume-boundary surface 52H, as shown. In turn, the upper and lower volume-boundary surfaces, front volume-boundary surface 52H and the three-dimensional display surface itself collectively circumscribe a three-dimensional display volume 53 disposed in the direction of the concavity of the three-dimensional display surface. In this second illustrative embodiment, the footprint size of the three-dimensional display structure is 2.5 feet deep, 4.75 feet wide and 3 feet high; the field of view of the display structure is 180° at the front volume-boundary surface; and volumetric capacity of three-dimensional display volume of the system is less than about 35 cubic feet.

While not shown in FIG. 3, an optical bench similar to the one shown employed in the system of FIG. 1 is also used to support the high-resolution image projectors and projection-beam folding mirrors of the stereoscopic display system of this illustrative embodiment. Also, a lightweight optically-opaque fabric cover 55 extends over and hides the image projectors and projection-beam folding mirrors, in order to effectively reduce stray light from overhead lighting sources which otherwise would detract from the viewing of displayed imagery.

Having described the structure and function of the display system of the present invention, it is appropriate at this juncture to describe the stereoscopic display process supported thereon.

As shown in the illustrative embodiment of FIG. 1, during each interactive viewing session, the viewer 60 wears head-position sensor 41B and electrically-passive polarizing spectacles 70 while sitting comfortably on a chair 61 positioned in the direction of the concavity of the three-dimensional display surface. As shown, during the viewing session, the viewer's head resides within the viewing volume of the system. Naturally, the function of the chair is to support the viewer relative to the three-dimensional display surface so that the viewer is free to move his or her head and thus view the left, central and right polarized SMIs from anywhere within the three-dimensional viewing zone 18, while employing his or her peripheral vision. Notably, the viewing volume or zone of the system is spatially encompassed within and fixed relative to the three-dimensional display volume, and is substantially free of "projected" light rays emanating from the image projectors of the system, towards the display surface regions.

During each synchronized display period of the display process hereof, the left, central and right image projectors simultaneously produce left, central and right polarized SMI-type images, respectively. Specifically, the left polarized SMI is reflected off the left beam folding mirror 7 and thence projected onto the left display surface region in such a manner that the light rays emanating therefrom towards the left display surface region are generally confined within a left image projection volume 63. As shown, the left image projection volume is substantially spatially encompassed within the three-dimensional display volume of the system. The central polarized SMI is reflected off the central beam folding mirror 8 and thence projected onto the central display surface region in such a manner that the light rays emanating therefrom towards the central display surface region are generally confined within a central image projection volume 64. As shown, the central image projection volume is substantially spatially encompassed within the three-dimensional display volume of the system. At the same time, the right polarized SMI is reflected off the right beam folding mirror 9 and thence projected onto the right display surface region in such a manner that the light rays emanating therefrom towards the right display surface region are generally confined within a right image projection volume 65. As shown, the right image projection volume is substantially spatially encompassed within the three-dimensional display volume of the system.

Notably, once the projected light rays impinge on and reflect off the polarizing-preserving display surface 2, they scatter and are allowed to freely propagate through display volume 17 and viewing volume 18 of the system, where only left-eye polarized light rays are permitted to pass through the polarizing lens in front of the viewer' left eye, while only right-eye polarized light rays are permitted to pass through the polarizing lens in front of the viewer' right eye, thus facilitating stereoscopic viewing in accordance with the principles of the spatial-multiplexing display process.

Having described the illustrative embodiments of the present invention, several modifications readily come to mind.

The display surface regions of the three-dimensional display structure may be realized as arbitrary display surfaces, coated with polarizing-preserving material. These arbitrary display surface regions may be smooth or polygonal in nature. Also, the projection-beam folding optics of the system can be adjusted so that the projection rays from each image projector are tightly constrained to the projection volumes specified by display surface regions of arbitrary surface geometry, thereby maximizing the viewing volume of the projection display system.

The projection display system of the present invention can be adapted for placement on top of support surfaces other than desks and floor surfaces, such as countertops and support bases particularly adapted to the application at hand. In alternative embodiments, the three-dimensional display surface of the projection display system can be constructed so as to be collapsable for ease of transportability.

Optionally, keystone image-distortion introduced during the image projection process may be corrected using pixel-processing techniques upon computed perspective or SMI images, rather than through Fresnel or holographic filters used in the individual image projectors.

The desktop projection display system of the present invention can be mounted on a moveable platform for use in flight simulators, driving simulators, interactive virtual-reality games, and the like.

The desktop projection display system of the present invention can be adapted for use by two or more viewers. In such embodiments, one or both viewers can be equipped with means for generating viewing direction parameters, for input to the computer-based modeling subsystem of the SMI generation system 10, shown in FIG. 4B. When two or more viewers are each to supply viewing direction parameters to the computer-based modeling subsystem, it may be necessary or desirable to use these plural sets of viewing direction parameters in order to compute, for each future display period, a set of "averaged" viewing direction parameters. In turn, these averaged viewing direction parameters can be used to generate and project SMI images, towards which the multiple viewers are collectively afforded maximal fields of view. This mode of operation is highly advantageous for interactive video-game and virtual reality applications involving multiple viewers.

The desktop-based projection stereoscopic display system of the present invention is ideally suited for displaying multiple three-dimensional "windows" or "viewports". In such applications, the multiple viewports can be viewed stereoscopically, providing numerous advantages in multi-tasking application environments.

The projection display system and method of the present invention have been described in great detail with reference to the above illustrative embodiments. However, it is understood that other modifications to the illustrative embodiments will readily occur to persons with ordinary skill in the art. All such modifications and variations are deemed to be within the scope and spirit of the present invention as defined by the accompanying Claims to Invention.

What is claimed is:

1. An image display system for simultaneously displaying a plurality of optical images of a three-dimensional object taken from a plurality of viewing directions defined relative to said three-dimensional object, said image display system comprising:

a three-dimensional display surface of generally concave geometry and electrically-passive construction, said three-dimensional display surface having at least first and second display surface regions in spatially contiguous relation to each other, an upper edge surface bordering at least a portion of said first display surface region, a lower edge surface bordering at least a portion of said second display surface region, a first side edge surface bordering at least said first display surface region, and a second side edge display surface bordering at least said second display surface region, wherein said upper edge surface defines an upper volume-boundary surface, said lower edge surface defines a lower volume-boundary surface, said first and second edge surfaces define a front volume-boundary surface, and said upper and lower volume-boundary surfaces, said front volume-boundary surface and said three-dimensional display surface collectively circumscribe a three-dimensional display volume disposed in the direction of the concavity of said three-dimensional display surface;

first image signal generation means for generating a first electrical signal representative of a first optical image of said three-dimensional object viewed along a first viewing direction;

second image signal generation means for generating a second electrical signal representative of a second optical image of said three-dimensional object viewed along a second viewing direction;

first optical image producing means, fixedly disposed adjacent said upper volume-boundary surface and responsive to said first electrical signal, for generating said first optical image and projecting said first optical image onto said first display surface region of said three-dimensional display surface such that the light rays emanating from said first optical image producing means towards said first display surface region are generally confined within a first image projection volume substantially spatially encompassed within and stationarily fixed relative to said three-dimensional display volume; and second optical image producing means, fixedly disposed adjacent said upper volume-boundary surface and being responsive to said second electrical signal, for generating said second optical image and projecting said second optical image onto said second display surface region of said three-dimensional display surface such that light rays emanating from said second optical image producing means towards said second display surface region are generally confined within a second image projection volume substantially spatially encompassed within and stationarily fixed relative to said three-dimensional display volume, whereby a viewer supported in the direction of the concavity of said three-dimensional display surface is free to view said first and second projected optical images from anywhere within a three-dimensional viewing zone being spatially encompassed within and stationarily fixed relative to said three-dimensional display volume, and substantially free of projected light rays emanating from said first and second image projection means towards said first and second display surface regions, respectively.

2. The image display system of claim 1, wherein said said first and second display surface regions each have a planar surface geometry.

3. The image display system of claim 2, wherein said upper edge has a piece-wise rectilinear geometry and said upper volume-boundary surface has a planar surface geometry.

4. The image display system of claim 3, wherein said lower edges has a piece-wise rectilinear geometry and said lower volume-boundary surface has a planar surface geometry.

5. The image display system of claim 4, wherein said first and second side edges each have a rectilinear geometry and said front volume-boundary surface has a planar geometry.

6. The image display system of claim 1, wherein said three-dimensional display surface is smooth over its entire spatial extent.

7. The image display system of claim 1, wherein said first optical image producing means comprises a first light source for producing visible light, a first programmable spatial light mask for spatial filtering said produced light from said first light source in accordance with said first electrical signal so as to produce said first optical image, and a first light projecting means for projecting said first optical image onto said first display surface region; and wherein said second optical image producing means comprises a second light source for producing visible light, a second programmable spatial light mask for spatial filtering said produced light from said second light source in accordance with said second electrical signal so as to produce said second optical image, and a second light projecting means for projecting said second optical image onto said second display surface region.

8. The image display system of claim 7, wherein said first programmable spatial light mask comprises a first LCD panel, and said second programmable spatial light mask comprises a second LCD panel.

9. The image display system of claim 1, wherein said first light projecting means comprises a first reflective surface disposed stationarily with respect to said three-dimensional display surface, and wherein said second light projecting means comprises a second reflective surface disposed stationarily with respect to said three-dimensional display surface.

10. The image display system of claim 1, which further comprises a upper surface covering means, fixedly with respect to said three-dimensional display surface, for covering said first and second optical image producing means.

11. The image display system of claim, wherein said three-dimensional display surface comprises an inflatable structure having a light reflective surface.

12. The image display system of claim 1, wherein said first and second signal generation means comprises a computer-based system programmed for generating said first and second electrical signals.

13. The image display system of claim 1, wherein said first and second signal generation means comprises an electro-optical camera system having means for generating said first and second electrical signals.

14. The image display system of claim 1, wherein said first optical image is a first polarized spatially multiplexed image of said three-dimensional image taken along said first viewing direction, and wherein said second optical image is a second polarized spatially multiplexed image of said three-dimensional image taken along said second viewing direction, and said three-dimensional display surface is a light reflective surface with polarization-preserving properties.

15. The image display system of claim 14, which further comprises a pair of electrically-passive polarizing spectacles for viewing of said first and second polarized spatially multiplexed images projected onto said first and second display surface regions, respectively.

16. The image display system of claim 1, wherein said three-dimensional display surface is supportable on a substantially planar surface selected from a group consisting of a desktop, a support base and a floor surface.

17. The image display system of claim 1, wherein said three-dimensional volume has a volumetric capacity on the order of less than about 35 cubic feet.

18. The image display system of claim 1, wherein said three-dimensional display surface has a footprint of about 2.5 feet deep, about 4.75 feet wide and about 3 feet high.

* * * * *